United States Patent [19]

Ledford, Jr.

[11] Patent Number: 5,215,340
[45] Date of Patent: Jun. 1, 1993

[54] CAPILLARY QUICK-CONNECT

[75] Inventor: Edward B. Ledford, Jr., Lincoln, Nebr.

[73] Assignee: ICR Research Associates, Inc., Lincoln, Nebr.

[21] Appl. No.: 784,523

[22] Filed: Oct. 29, 1991

Related U.S. Application Data

[63] Continuation-in-part of Ser. No. 662,835, Mar. 1, 1991, Pat. No. 5,163,215.

[51] Int. Cl.⁵ .............................................. F16L 37/08
[52] U.S. Cl. ................................... 285/312; 285/320; 403/110; 403/377; 403/374
[58] Field of Search ............... 285/320, 317, 309, 310, 285/311, 312, 279, 280; 403/109, 110, 108, 377, 374, 409.1

[56] References Cited

U.S. PATENT DOCUMENTS

| | | | |
|---|---|---|---|
| 1,483,268 | 2/1924 | Baldauf | 285/320 X |
| 1,991,343 | 2/1935 | Ball | 285/310 |
| 2,770,474 | 11/1956 | Krapp | 285/312 X |
| 4,586,732 | 5/1986 | Anderson, Jr. | 285/12 |
| 4,787,656 | 11/1988 | Ryder | 285/177 |
| 4,991,883 | 9/1989 | Worden | 285/342 X |
| 5,163,722 | 11/1992 | Worden | 285/101 X |

Primary Examiner—Randolph A. Reese
Assistant Examiner—George D. Spisich
Attorney, Agent, or Firm—Watson, Cole, Grindle & Watson

[57] ABSTRACT

An apparatus for connecting the end of a tubular body, particularly a chromatographic capillary tube, to a detection or injection device fitting including a holder having a ferrule for holding the tubular member and an insertion assembly to engage the device fitting. The assembly is adapted to contain the holder and force the ferrule into a seated relation with the device fitting. A method for connecting a tubular member to a device fitting is also provided.

16 Claims, 5 Drawing Sheets

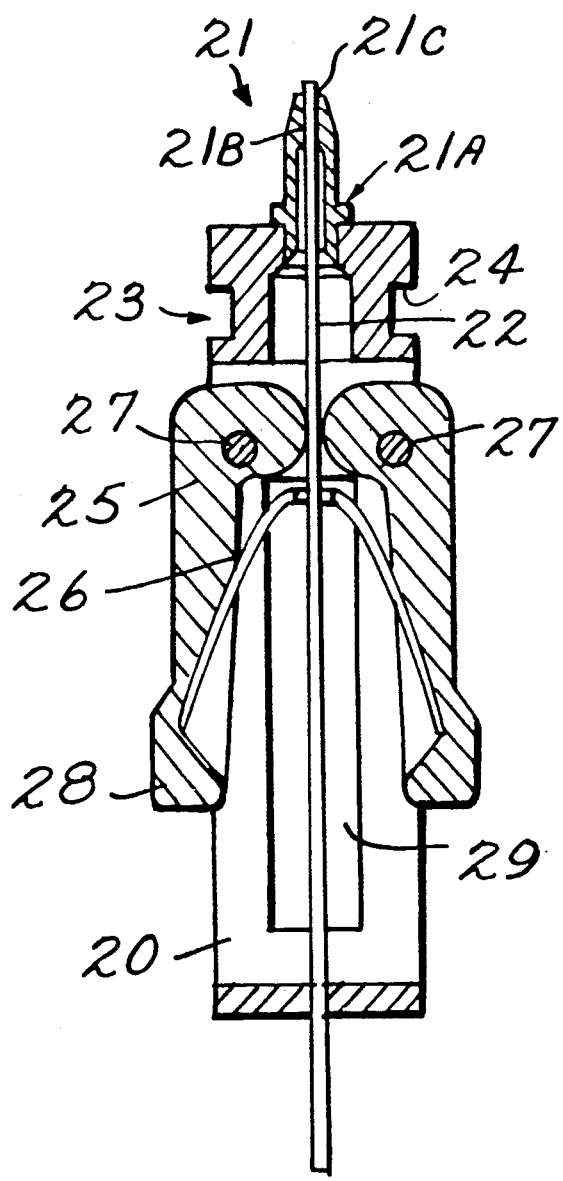
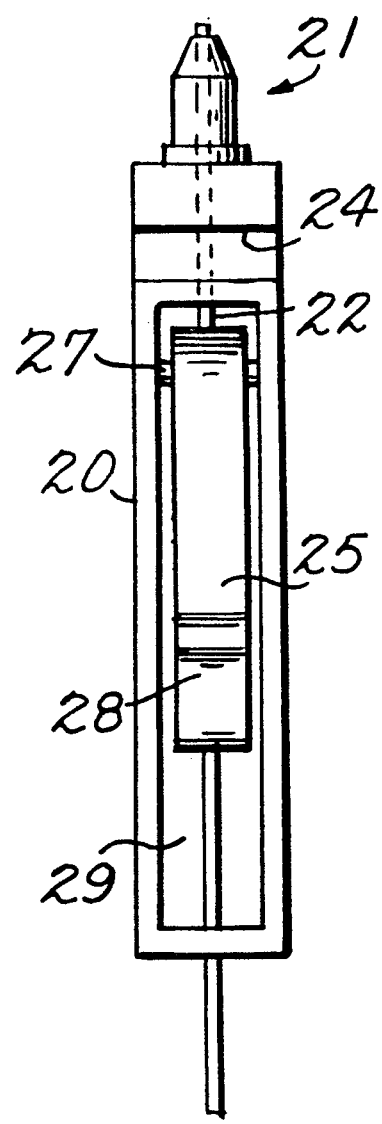

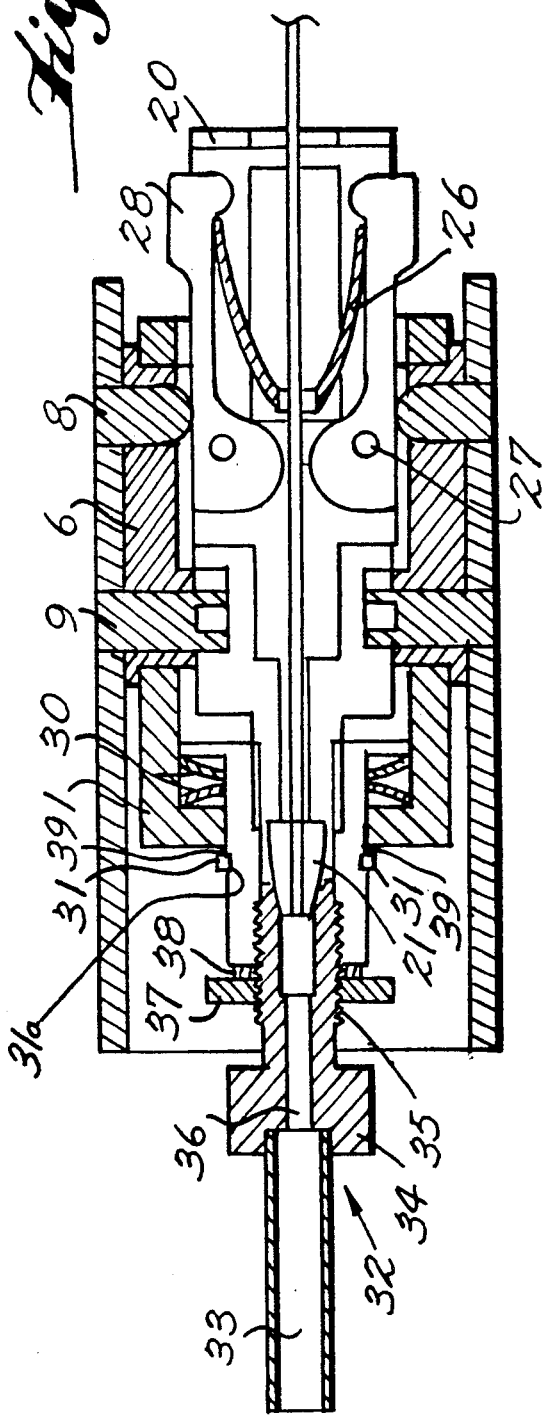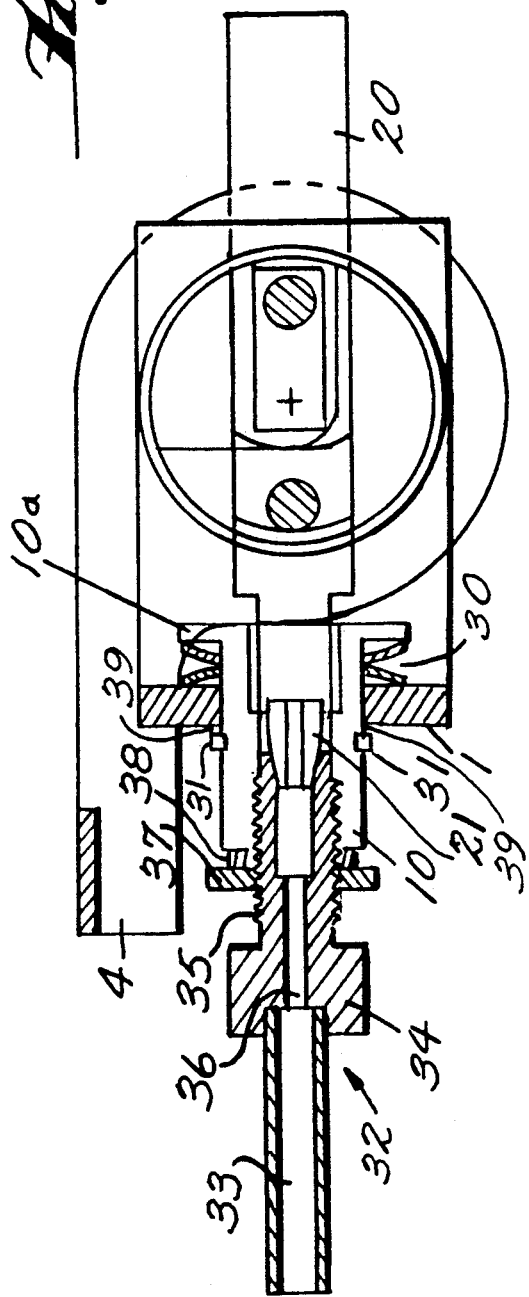

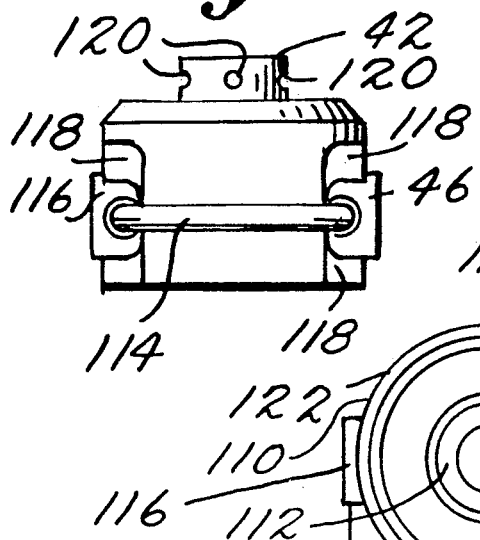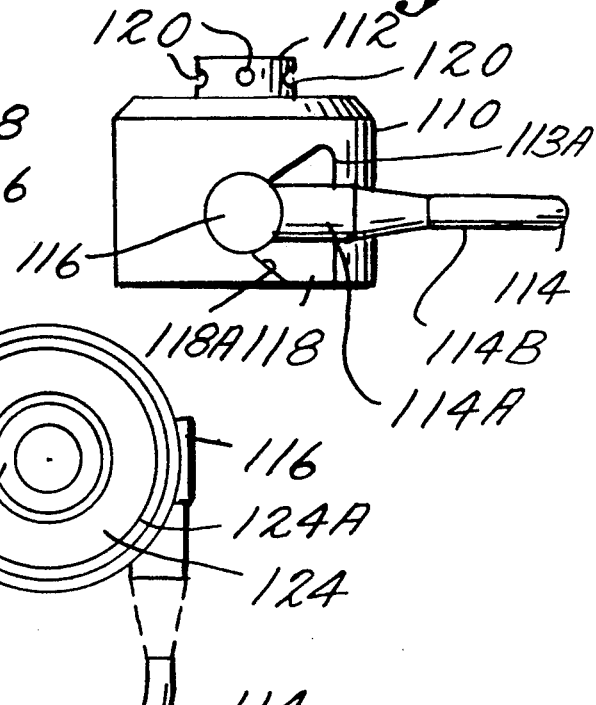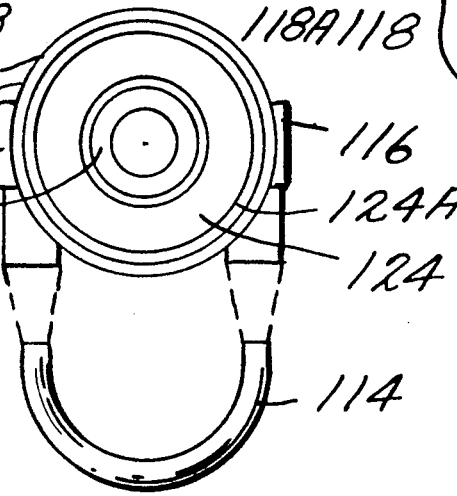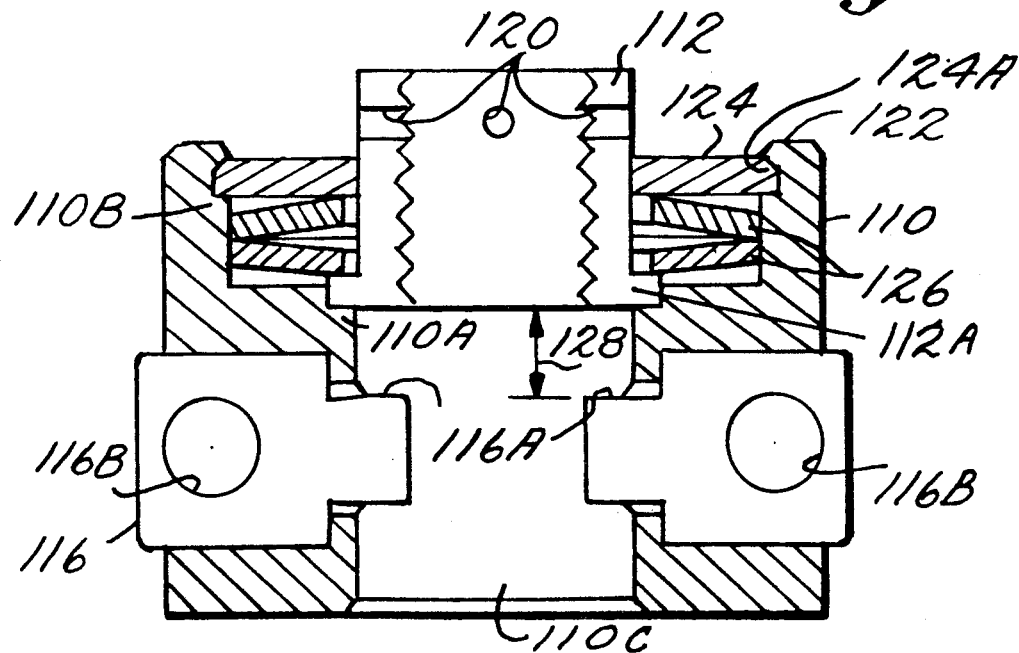

CAPILLARY QUICK-CONNECT

RELATED APPLICATIONS

This application is a continuation-in-part of U.S. application Ser. No. 07/662,835 filed Mar. 1, 1991 and entitled "Capillary Quick-Connect", which is now U.S. Pat. No. 5,163,215.

BACKGROUND OF THE INVENTION

The present invention relates to a connection for a tubular member and more particularly to an end connection for a capillary tube. The invention moreover relates to a quick-connect for a chromatographic capillary tube column.

In one class of chromatographic methods, electrically neutral analytes are entrained by a mobile fluid which carries them down the bore of a capillary tube or column. Analytes undergo partitioning between this mobile fluid, or mobile phase, and a stationary phase coating the inner wall of and/or packing interior to, the capillary bore. In this class of chromatography, the mobile phase may be gas, liquid or supercritical fluid giving rise to methods and apparatus commonly known as capillary gas chromatography, microbore liquid chromatography or supercritical fluid chromatography, respectively.

In another class of chromatographic methods, electrically charged analytes are propelled by an electric field through a stationary phase filling the bore of a capillary tube. This class of methods and apparatus is commonly known as capillary zone electrophoresis.

In prior art forms of capillary chromatography, capillary columns are sealed into sample injector means and sample detection means using tapered deformable seals or ferrules through which the columns are inserted. The ferrules are deformed under pressure supplied by an external torqued hexagonal nut, which forces the ferrule taper against a tapered metallic seat such that the ferrule contracts radially about the capillary column inserted through the ferrule, thus effecting a tight seal. Ferrules of this type are preferably high-temperature plastic deformable ferrules. Graphite-Vespel ® ferrules are preferred.

In chromatography, it is important to be able to quickly connect the ends of a chromatographic column to both an injection device for feeding a sample and a detection device for analyzing the sample after it has travelled through the length of the column. It is also important to be able to quickly change capillary tubes.

One process of changing a capillary gas chromatographic column has been widely employed. A nut and ferrule are slipped over the end of a capillary tube. Following insertion through the ferrule, the operator cleaves a small length of capillary tube from the end of the column to be sure the operative column end is open and free of small particles or ferrule shavings which would obstruct the flow of mobile phase during chromatographic separation. The operator then gathers the nut and ferrule together along the length of the column, and draws the end of the column into proximity to the forward end of the ferrule. Immobilizing the column position relative to the ferrule end with one hand, the operator paints a mark on the column near the back of the nut using, for example, Liquid Paper ®, commonly used to cover typographical errors in typed documents. The operator then memorizes the position of the spot relative to the back of the nut. The nut/ferrule/column combination is then inserted into, for example, an injector port of a capillary gas chromatograph. The nut is tightened partially, and the column pulled to align the painted spot to its original position relative to the rear of the hexagonal nut. This positions the end of the capillary tube relative to the ferrule tip, a positioning critical to proper function of the injection means. The nut is then tightened. This procedure is repeated for the other end of the column, which is sealed into a detector port.

Methods of this type for sealing capillary columns into gas chromatographs suffer numerous disadvantages. Considerable manual dexterity is required of the operator to position the end of the column in proper spatial relation to the ferrule tip. Because columns are mounted in oven structures that are generally small and positioned below shoulder height on laboratory benches, operators must perform dexterous operations in cramped regions while bending over, in the case of top loading ovens, or squatting down and straining upwards in the case of front loading ovens. It is not uncommon for the nut and ferrule assembly to slip at some point in the installation process, often becoming entangled or mechanically engaged with wire frame cages on which columns are mounted, with resulting inconvenience and occasional column damage. Threaded fittings and nuts wear out and have to be replaced, further adding to the cost and inconvenience of known gas chromatographs. Column positioning errors commonly cause dead volume in injectors or detectors, which leads to undesirable tailing of chromatographic peaks. In capillary column manufacturing operations, particularly quality testing, in which large numbers of columns must be connected and disconnected on a daily basis, operator fatigue can reduce overall production efficiency and increase production costs. Wrenches used to tighten ferrule nuts are often dropped, resulting in damage to expensive capillary columns. Also, operators often accidentally paint fingers and gloves with the marking fluid.

The aforementioned disadvantages, which present problems in capillary gas chromatography, also present problems in other forms of capillary chromatography.

SUMMARY OF THE INVENTION

It is an object of this invention to provide a means of connecting capillary columns to chromatographs and a method which overcome the above-mentioned disadvantages.

It is a further object of this invention to provide a capillary quick-connect system which requires no tools for installation and operation.

It is a still further object of this invention to provide a capillary quick-connect that supplies a torque-free, longitudinal sealing force upon a sealing ferrule.

It is yet a further object of this invention to provide a capillary quick-connect system that is lightweight, and which presents negligible thermal load to the capillary column.

It is yet a further object of this invention to provide a capillary quick-connect system that captures a ferrule in a holder assembly.

It is yet a further object of this invention to provide a ferrule which guides a column through its central bore.

It is yet a further object of this invention to provide a column holder assembly.

It is yet a further object of this invention to provide a column holder assembly that can immobilize a column relative to a ferrule captured by the holder assembly.

It is yet a further object of this invention to provide a column holder assembly which permits an operator to easily cut a fresh column end, easily position the column end relative to the tip of a captured ferrule, and easily immobilize the column within the holder assembly in proper spatial relation to the column tip.

It is yet a further object of this invention to provide a lever operated insertion assembly capable of accepting a column holder assembly and transmitting torque-free insertion and sealing force thereto.

It is still a further object of this invention to provide a capillary quick-connect which, when in its operational configuration, makes no mechanical contact with the capillary column except at the ferrule seal.

It is yet a further object of the invention to provide a capillary quick-connect assembly that exposes the column to oven atmosphere, which the assembly itself can be exposed to oven atmosphere, and which is inexpensive and easy to operate.

In accordance with the above and further objects of the invention, a capillary quick-connect system comprises a column holder and an insertion assembly.

The present invention has several advantages. The column holder eliminates free slippage of parts along the column, and breaks the installation process into a series of small steps that can be performed rapidly, without demand upon the operator. The quick-connect will greatly reduce operator bending and straining. The position of the column relative to the ferrule tip can be set accurately, and will not slip, eliminating time consuming correction of column positioning error. The quick-connect eliminates threaded parts which wear out, thus reducing consumables cost. External tools, e.g., wrenches, and associated invention preserves, and indeed simplifies, the necessary practice of cutting fresh column ends to avoid clogging. No torque is transmitted to the column. Columns stored with column holders can be rapidly exchanged.

BRIEF DESCRIPTION OF THE DRAWINGS

The above noted and other features of the invention will be better understood when considered with reference to the accompanying drawings, in which:

FIG. 2 is a cross-sectional view of the column holder assembly according to the present invention;

FIG. 3 is a side view of the column holder assembly according to the present invention;

FIG. 4 is cross-sectional view of the holder assembly inserted and locked into the insertion assembly according to the present invention;

FIG. 5 is a side cross-sectional, and partially transparent view of the assembly shown in FIG. 4;

FIG. 6 is a side view of an insertion assembly according to another embodiment of the present invention;

FIG. 7 is a front view of the embodiment shown in FIG. 6;

FIG. 8 is a top view of the insertion assembly according to FIG. 6;

FIG. 9 is a mid-sectional view of the insertion assembly according to FIG. 6;

DETAILED DESCRIPTION OF PREFERRED EMBODIMENTS

Figure 1:
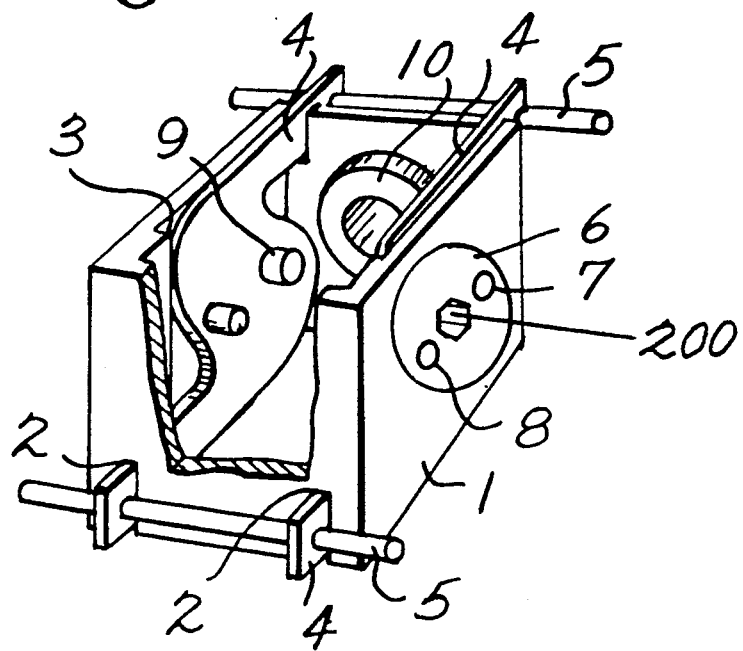
FIG. 1 is a partially broken away perspective drawing of the insertion assembly according to the present invention.

The present invention provides a connection for a tubular member, particularly a capillary tube. According to the invention, the connection is easy to use and quickly connects the end of a tube to a standard fittings in a locking relation.

In one embodiment of the present invention, a tube holder, or column holder for chromatographic applications, holds a tube by a gripping action. When the tube is to be connected to a device fitting, the holder is inserted into an insertion assembly which can be activated to a closed and locked position. In this position, the assembly provides a sealed and firm connection of the tube to the device fitting.

According to the present invention, a column holder is provided which captures a ferrule at its forward end. Preferably, a pair of spring-biased pivoted grips of jaws interior to the column holder clip the column and immobilize it when the jaws are released. Depressing the jaws frees the column so that it can slide relative to the ferrule. The column holder assembly carries engaging means, preferably a pair of notches, or shoulders, to which longitudinal insertion and sealing force can be applied.

In operation, the jaws of the column holder are opened by depressing them between the thumb and forefinger of one hand. The column is inserted through the ferrule. The jaws are released, immobilizing the column, the end of which is cut off using methods commonly practiced in the art. The operator again depresses the jaws, positions the column relative to the ferrule, and releases the jaws. Finally, the operator inserts the column holder into the insertion assembly, flips the lever integral thereto, and installs the column To remove the column, the operator releases the lever. There is no need to separate the column from the holder assembly. The operator caps the column and stores it for future use, leaving the holder in place to facilitate later reinstallation.

The insertion assembly preferably comprises a fitting having an opening through which a material or a tube or liner can travel. In chromatography, injection and detection devices usually have threaded fittings to which the insertion assembly engages. The assembly, therefore, preferably also comprises a threaded fitting, most preferably a threaded spindle. Other fittings known to those of skill in the art may be employed.

When a threaded spindle is used, a test piece of column approximately three inches long is inserted into the holder and the holder, carrying the piece of column, is inserted into the insertion assembly. The lever is then rotated to the closed and locked position and the insertion assembly together with the locked holder containing the length of column is screwed onto the device fitting until the length of column is sealed. It is this action that sets the sealing force. A locknut is then preferably employed to lock the spindle and device fitting together in the relation such that a tight fit between the ferrule of the holder and the spindle/fitting combination is held.

Once the insertion assembly fitting and the device fitting have been engaged, the lever is opened and the holder containing the length of column is removed. The length of column is then removed from the holder. The column to be sealed may then be inserted into the holder and immobilized therein by a gripping action. The holder with the column to be sealed is then inserted into the insertion assembly and the lever is activated to secure the holder within the insertion assembly. This also deforms the ferrule in the end of the holder into a sealed relation with the column and the device fitting. Material travelling out of the end of the tube can then pass through the assembly fitting and device fitting without leakage. If material is to be passed into the tube from an injection device, the same type of fitting relation is used to provide a tight connection which does not leak. Preferably, the tube holder is provided with a ferrule end fitting. A tube is passed through the gripping means then through the ferrule and held in place by action of the gripping means until locked in the insertion assembly.

Once the holder is inserted into the insertion assembly, a lever on the insertion assembly is rotated, causing engaging means connected to the lever to move into contact with engaging means of the holder assembly. For example, a cam may displace the holder longitudinally toward the injector or detector port loading a belleville spring washer, which transmits sealing force to the end of the holder, preferably a ferrule. Secondary means, also caused to be moved as the lever is activated, depress the jaws of the column holder shortly after the ferrule sealing force is applied, thus freeing the column from mechanical contact with any portion of the assembly but the ferrule.

In a preferred embodiment, the lever device comprises at least one lever handle and means connected to the handle to move the holder device and force the ferrule thereof into a tightly sealed relation with the column and the device fitting. The lever may be connected to a rotating member to which is connected at least one means for engaging the holder assembly and moving it into a sealed relation with the device fitting. The rotating member may be geared and actuated by a pinion or worm drive. If the engaging means are connected to the rotating member off center of the member's axis of rotation, once engaged, the holder is forced to move toward the assembly fitting through cam action.

The engaging means of the insertion assembly preferably comprises a protrusion on the rotating member. Preferably, the means comprise a roller which can rotate about an axis off center to the axis of rotation of the rotating member.

The engaging means of the insertion assembly mates with corresponding engaging means on the holder. If a protrusion is used for the engaging means of the rotating member, a corresponding recess may be formed on the holding device in which the protrusion mates and can transfer an applied force. An opposite relation may also be used or other well known engaging means.

FIG. 1 shows a partially cut away perspective view of an insertion assembly according to the present invention comprising a frame 1 in which notches 2 and recesses 3 are machined to accommodate a pair of "S" shaped lever arms 4. The lever arms 4 are connected by handles 5. A pair of rotors 6 are imbedded in holes machined into the side of the frame 1.

In the center of each rotor is a hexagonal opening 200 whose center defines the axis of rotation of the rotor. The lever arms may be opened by rotating the rotors with an allen wrench. Thus, the handling of potentially hot lever arms is avoided. Each lever arm has a roller axle 7, and a rounded pin 8 diametrically opposed thereto. The roller axle 7 captures a roller 9 near the inner surface of each lever arm 4.

The insertion assembly attaches to an injector or detector port of a chromatograph via a spindle 10, which is machined to adapt to the particular fittings used in the chromatograph.

In chromatographs, injection and detection devices are provided with injector and detector ports, respectively. At these ports are fittings such as a Swagelok ® fittings to which a device according to the present invention may connect. Swagelok fittings are depicted as 32 in FIGS. 4 and 5. These fittings consist of a nipple 33, a hex nut portion 34 and an exterior threaded portion 35. A passageway 36 is provided which extends through the center of the fitting 32 through which a sample flows to a detection device or from an injection device.

The fitting 32 threadably engages the interior threads of the spindle 10 as shown in FIGS. 4 and 5. A lockwasher 38 and locknut 37 share the exterior threads 35 of the fitting 32 with the spindle 10 and prevent the fitting and spindle from unscrewing and disengaging while maintaining the proper force on the ferrule 21.

In FIG. 1, the lever arms 4 are shown in the closed and locked position. Prior to locking, the lever is rotated 90 degrees from the position shown in FIG. 1 and the column holder is inserted into the insertion assembly through a hole in the bottom thereof. The lever is then returned to the position shown in FIG. 1.

FIGS. 2 and 3 show side-sectional views of the column holder assembly comprising a holder body 20 into which a ferrule 21 is threaded. The ferrule exterior is stepped at step 21a, and its interior is bored and tapered so as to guide a capillary column 22 through its center bore 21b. The top of the holder is counter-bored so as to continue the interior guiding taper of the ferrule 21 into the counter-bore of the holder. The top of the holder is notched on either side at notch 23, providing shoulders 24 which are engaged by the roller 9 of the insertion assembly when the lever 4 of the insertion assembly is brought to the closed position. A pair of jaws 25 are biased normally closed by a V-shaped spring 26, and rotate freely on a pair of pivots 27. Finger pads 28 near the bottoms of the jaws, when depressed, cause the upper portions thereof to separate, thus releasing the column 22. When the fingerpads 28 are released, the jaws 25 close under spring pressure and grip the column 22. The jaws are polished smooth so as not to gouge or score the exterior of the capillary column 22. The jaws may be made of metal, ceramic, or of high temperature plastic, as for example, polyimide. A cutout 29 extending over most of the holder body 20 exposes the column 22 to the heated atmosphere of a gas chromatographic oven, thereby reducing thermal load upon the column.

FIGS. 4 and 5 show the closed quick-connect assembly with the holder inserted and locked into position. The holder shown here has been simplified for clarity. The roller 9 rotates into the notch 23 near the top of the column holder, transmitting upward force against the shoulder 24. An equal and opposite force is exerted downward upon the roller 9. This downward force component is transmitted via the rotor 6 to the frame 1, which, because it slips over the spindle 10, is forced downward as well, toward the flange 100a at the bottom of the spindle 10. Because the spindle 10 is locked to the chromatographic fitting 32 by a locknut 37, and is stationary, downward movement of the frame compresses a pair of belleville washers 30 disposed between the underside of the topmost portion of the frame and the spindle flange. These belleville washers 30 supply sealing force to the ferrule 21. Preload on the belleville washers is maintained with a snap ring 31, which engages a groove 31a in the exterior of the spindle 10, and locks the frame into preload position. A gap 39 exists between the snap ring 31 and the frame 1 when the assembly is in the locked position.

To install the quick-connect assembly, a short piece of column is immobilized in the holder. The holder is inserted into the insertion assembly and the lever rotated to the closed position. A locknut is threaded onto the injector or detector port fitting. The entire assembly is threaded onto the chromatograph inlet or detector port fitting by hand, until the ferrule seals, as indicated by firm tug on the short length of column which will not move if sealed. The locknut is then turned by hand down onto the spindle. The levers are then opened, the short length of the column removed, and the column to be used is inserted into the holder. After cutting a fresh end, the column end is positioned relative to the ferrule tip 26, locked by releasing the jaws 28, and inserted into the insertion assembly. Closing the levers 4 of the insertion assembly completes column installation.

According to another embodiment of the present invention, an improved connection is provided which is easy to use, quickly connects and disconnects the end of a tube to and from a fitting, requires fewer parts, is simpler to manufacture, is more reliable and is less expensive.

In its general features, the embodiment described hereforth resembles the first described embodiment. A tube holder grips a tube. The forward end of the tube holder captures a deformable sealing member, such as a ferrule commonly employed in analytical chemistry applications involving capillary tubing. The combination tube and tube holder are inserted into an insertion assembly installed upon, or integral with, a device fitting. Engagement means shared by the holder assembly and insertion assembly cause the former to be secured into the latter. Actuation means, integral to the insertion assembly when actuated, further cause engagement means to apply a longitudinal and substantially torqueless force upon the holder assembly, forcing the ferrule at the end of the holder assembly into a conical seat in the device fitting. Radial contraction of the ferrule brings the tube inserted through the ferrule center into sealed relationship with the device fitting. When the actuation means is reversed, the sealing relationship is broken, and the holder and tube combination is easily removed from the insertion assembly.

As in the first embodiment, the holder is equipped with tube gripping means, however, in this embodiment the gripping means are formed from a single piece of spring metal, herein referred to as a column clip, a tube clip, or simply a clip. The column clip incorporates into a single piece of metal, spring bias, manually or automatically operable tube gripping and releasing action, and gripping jaws having operating principles similar to that of the previous embodiment. The previous embodiment, however, employed a multiplicity of metallic parts to achieve the basic functionality of the invention.

Referring to FIGS. 6-14, FIG. 6 shows a side view of an embodiment of the present invention which comprises a housing 110, a spindle 112, a lever 114, and a cam 116 into which the lever 114 is press fit. The larger diameter portion 114A of the lever 114 rides in recess 118, milled into the side of housing 110 with a ball-nosed end-mill having a radius equal to that of the radius of lever portion 114A. By plunging the ball-nosed end-mill a few thousandths of an inch, such as 0.005 inch, into the surface of the recess 118 along the edges thereof, depressions can be formed in the regions 118A near the edges of recess 118. The depressions provide tactile feedback as the lever reaches the end of its travel up or down. The edges of the recess 118, shown inclined to the horizontal in the view of FIG. 6, also function as positive stops which delimit lever movement. The lever is manually operated by finger pressure applied to the reduced diameter portion 114B of lever 114. To aid installation of the insertion assembly onto a device fitting, the spindle 112 is provided with holes 120 to accommodate a spanner wrench. Alternatively, the spindle could be provided with external flats instead of holes to accommodate a common open-end wrench. Provision for tightening the spindle 112 onto a device fitting with a wrench is a precaution. The spindle is preloaded with belleville washers not shown in FIG. 6, which cause the spindle to drag by friction within the assembled housing assembly. This frictional resistance to rotation of the spindle is great enough that the insertion assembly can be threaded by hand onto a device fitting by means of threads interior to the spindle, and be tightened sufficiently to seal a ferrule before the spindle slips rotationally. This installation process, which is described in more detail below, permits the insertion assembly to be installed upon a threaded device fitting without the use of tools.

FIG. 7 shows a front view of the housing assembly. In this view, the curved contours of the recess 118 left by the ball-nosed milling step are more clearly shown.

FIG. 8 shows a top view of the insertion assembly. In this view a rim 122 integral to the top of the housing can be seen. Also clearly seen are washer 124 with bevel 124A on its outer diameter. The washer 124 slips over the spindle 112 and inside the rim 122. In FIG. 8 a one-inch scale is displayed which indicates the physical size of the insertion assembly.

FIG. 9 shows a mid-sectional view of the insertion assembly, comprising the housing 110, spindle 112, cams 116, washer 124 and belleville washers 126. From this view it is apparent that the spindle 112 is provided with a flange 112A which slips into a recess in the housing and makes contact with a pair of belleville washers stacked back-to-back. The belleville washers 126 rest upon a ledge 110A machined into the housing 110. The washer bears upon the flange 112A of spindle 112 such that the belleville washers are compressed somewhat, typically a few thousandths of an inch. Compression of the belleville washers preloads the spindle, making a friction contact between the top of the flange 112A and the bottom of the washer 124. Also apparent in this view are two cams 116 provided with holes 116 B into which the lever, not shown in this view, can be press fit. Each cam is nominally cylindrical, and rotates within the housing 110 upon actuation of the lever press-fit into the holes 116B. Each cam has a reduced diameter portion that protrudes into the interior bore 110C of the housing. These protrusions engage the tube holder in a manner to be described. The protruded cam portions are provided with a flat 116A. When rotated, the cylindrical outer surface of the reduced diameter portion of the cam takes up a portion of the distance 128, causing the distance to be reduced. This distance reduction, associated with cam action, causes sealing force to be applied to the tube holder in a manner to be described.

Figure 10:
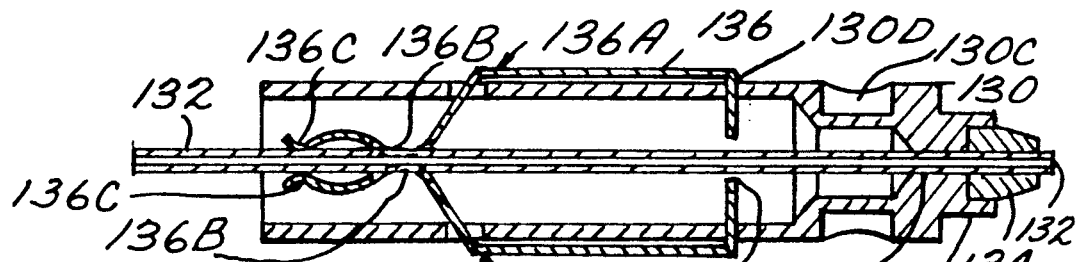
FIG. 10 is a side-sectional view of another tube holder for use with the embodiment shown in FIG. 6.

FIG. 10 shows a side-sectional view of a tube holder according to the present invention to be used in conjunction with the insertion device shown in FIG. 6. A holder body 130 provides a cupped end 130 A in which a ferrule 134 is captured by friction fit. A tube 132 is inserted through the ferrule 134. Notches 130C provide engagement means whereby the tube holder may engage those portions of the cams which protrude into the central bore of the housing, said engagement to be further described. A guide channel 130B facilitates insertion of tube 132 through captured ferrule 134 from left to right in the view shown. A clip 136 positioned within the column holder body 130 provides tube gripping means. A rectangular opening 130D in housing 130 accommodates one portion of clip 136 which snaps into said opening 130D, and is thereby retained in holder body 130. Clip 136 is fabricated from a strip of formed or bent spring metal such that jaws 136C can grip tube 132. Jaws are opened by rolling and pivoting action of bent tubes 132. Jaws are opened by rolling and pivoting action of bent clip portions 136B, which rolling and pivoting action is caused by inward pressure upon outer portions of clip 136 in the directions indicated at 136A. This inward pressure is applied by squeezing the clip at 136A between thumb and forefinger. This inward pressure opens jaws 136C by rocking action at 136B. The clip is provided with a hole 136D at one end through which the tube 132 passes. In practice, it is found that a clip such as 136 grips a capillary column of the type used in gas chromatography so firmly that the assembly can be swung around an operator's head without slipping, yet no damage to the capillary column is observed.

Figure 11:
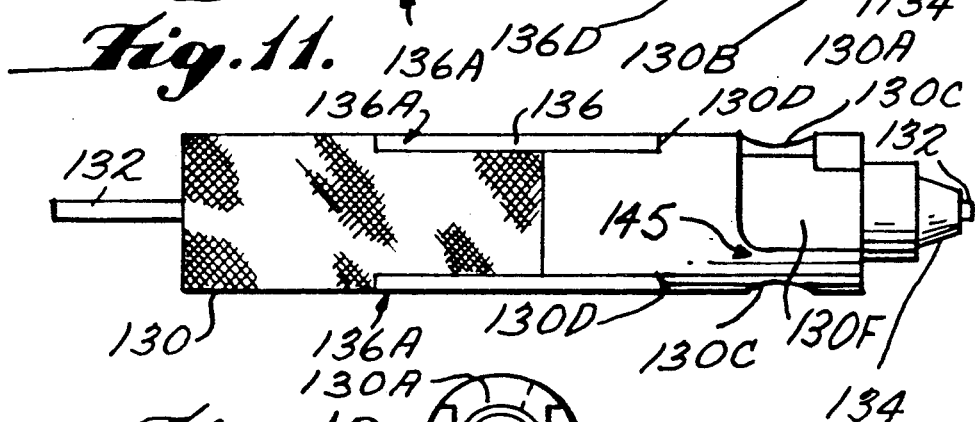
FIG. 11 is a side view of the tube holder according to the embodiment shown in FIG. 10.

FIG. 11 shows a side view of the tube holder assembly further clarifying the relationships between its parts. A portion of the clip 136 is visible, protruding through the rectangular opening 130D in holder body 130. Pressing at positions 136A between thumb and forefinger actuates the clip to the open position. The view shown in this figure also reveals a knurled portion 130E which aids in handling the holder body 130, and in the twisting thereof for engaging the insertion assembly, an operation to be further described. Also more plainly visible in this view is slot **130*f* which provides engagement means with the aforementioned cam protrusions interior to the housing bore. The slot 130*f* is longitudinal along a portion of its length, and circumferential along a second portion of its length. This slot profile would result, for example, by running a rotating mill bit at first longitudinally from right to left as shown through region 145, then rotating the tube holder body 130 about its longitudinal axis with said rotating mill bit held in place such that the slot 130F is extended azmuthally about the longitudinal axis of holder body 130**, as shown. Such an operation would be carried out on known three-axis CNC turning centers or Swiss screw machines.

Figure 12:
FIG. 12 is a front view of tube holder according to FIG. 10.

FIG. 12 is a front end view of the holder assembly shown in FIG. 11.

Figure 13:
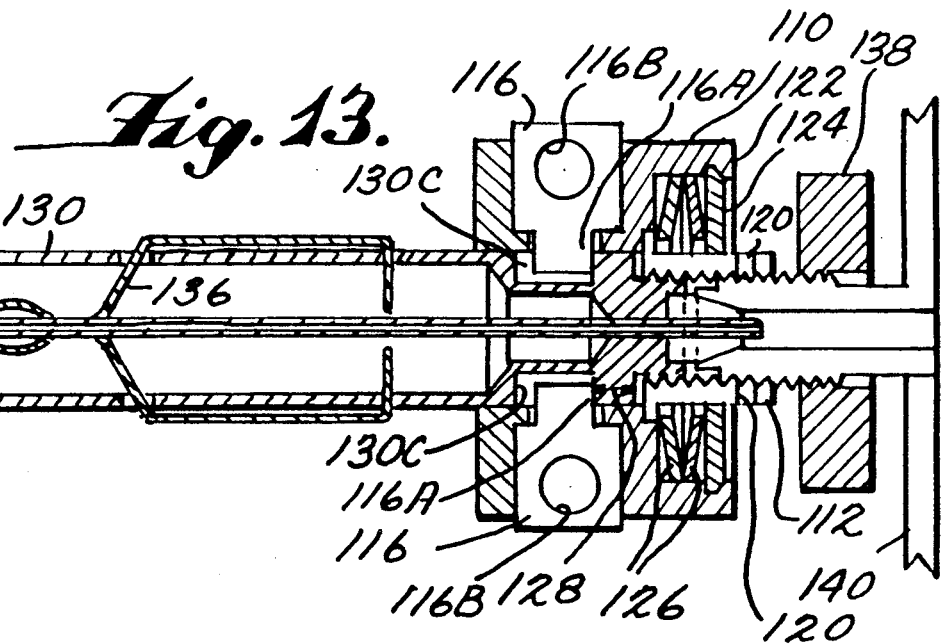
FIG. 13 is a side-sectional view of the tube holder according to FIG. 10 inserted into the insertion assembly of FIG. 6, which assembly is installed upon a device fitting.

FIG. 13 shows a sectional view of the fully operative quick-connect assembly in which tube holder 130 is inserted into housing 110. In this view, it is demonstrated that a flange 130E formed on holder body 130 by cutting of notch 130C rests upon flat 116A of cam 116. This illustrates one aspect of the engagement between the insertion assembly and the tube holder. This engaging relationship is established by rotating the tube holder about its longitudinal axis about ninety or more degrees with respect to the view shown in FIG. 13 so that upon insertion of the holder into the housing assembly, the longitudinal run of the notch 130C clears those portions of the cams 116 which protrude inside the central bore of the housing. Once inserted, the holder body is rotated about ninety degrees about its longitudinal axis to the position shown in FIG. 13 which causes the aforementioned engagement between the holder assembly and the insertion assembly. FIG. 13 also shows that the spindle 112 is threaded onto device fitting 140, and that lock-nut 138 can be used to lock the spindle 112 and device fitting 140 into fixed relationship once the installation of the insertion assembly onto the device fitting 140 is complete. The installation will be further described below.

Figure 14:
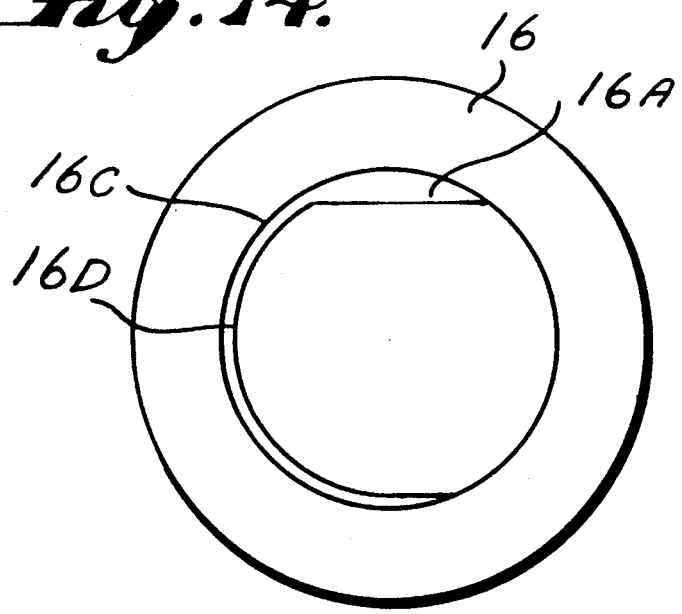
FIG. 14 is a front view of a cam according to the present invention.

FIG. 14 shows a front view of the cam 116. The outside diameter of the portion which protrudes inside the housing is indicated at 116C, and the aforementioned flat at 116A. This view reveals a reduced diameter 116D, which accounts for one of the most advantageous features of this embodiment. Rotation of the cam counterclockwise will lift any object resting or engaging the flat 116A by the full radius corresponding to circumference 116C, whereas clockwise rotation will lift the object by a lesser amount equal to the reduced radius corresponding to circumference 116D. Thus, when the lever (not shown in FIG. 14) is actuated so as to rotate the cam in one sense or the other, different net sealing forces on the ferrule result. The ability to seat a ferrule with a first sealing force or alternatively with a second sealing force is useful in the art of capillary chromatography. In that art, ferrules of different materials or elasticities, including graphatized Vespel® graphite are commonly employed, which materials require different sealing forces for proper ferrule sealing.

Installation of the insertion assembly onto the device fitting proceeds in the same way as previously described. Operation of the holder and tube combination, in cooperation with the insertion assembly, also proceeds in substantially the same way as previously described for the first mentioned embodiment.

Tube holder insertion and column gripping means differ in some respects from the first embodiment, however, as is further described below.

According to the present invention, the tube holder is inserted into the housing, then rotated about its longitudinal axis so as to engage the cams of the insertion assembly. Consequently, tube gripping means integral to the holder must be capable of rotational slippage, rolling, orbit, or other rotational movement about the longitudinal axis of the held tube, even as the tube is gripped, so as to prevent longitudinal displacement of the tube end relative to the end of the captured ferrule during the rotational movement. The clip 136, which is made of polished spring metal, achieves rotational slippage about the tube. It is found that the small amount of torque applied to the tube as a result of this rotational slippage is not important, even if the tube is a capillary of the type commonly employed in chromatography. An alternative embodiment of the clip would include needle bearings which would roll on the tube surface, but not slip in the longitudinal direction, the clip then forming a needle bearing race.

An important variation of the clip, which achieves one of the purposes of the prior embodiment, is to provide an extension, protrusion, or the like, which, when the lever is actuated, is forced by longitudinal displacement of the housing (associated with compression of belleville washers) toward the rear end of the holder body, so as to force the jaws of the clip open after the ferrule is brought into a sealing relationship with the tube and device fitting. In this way, the ferrule comprises a second tube gripping means, and the clip comprises a first tube gripping means acting automatically and in opposition to the second gripping means, such that the tube, once sealed into the device fitting according to the operations described above, is released by the first gripping means. This achieved, the tube makes mechanical contact only with the second gripping means, e.g., a ferrule, when sealed to the device fitting. While the provision of dual gripping means acting in opposition may not be necessary in all chromatographic applications, such as isothermal or slow temperature programmed gas chromatography, this measure is quite useful in other applications such as high speed temperature programmed gas chromatography or gas chromatography employing electrically powered capillary columns, in which it is desirable to minimize mechanical, thermal, or electrical contact with the capillary tube once it is sealed to the device fitting.

It is clear that although the size and weight of this embodiment are acceptable for chromatographic use, it is still possible to replace metal from the housing or remove it to further reduce size, weight and thermal inertia.

The housing, cams and holder body can be made of heat treated stainless steel. Hard surfaces are needed to prevent seizing and galling. The lever, washer and spindle can be made of free machining stainless steel.

Assembly can be achieved entirely from press-fit and coining operations. Individual parts are amenable to high speed automatic fabrication on CNC machining equipment. The apparatus is easy to install and operate and makes possible the reuse of ferrules, since overtightening of ferrules is avoided, and repeatable ferrule sealing force is achieved. Like the first embodiment, the connection can be used on tubing of any size provided appropriate sized insertion assemblies, holder assemblies and corresponding fittings are used.

In practice it is found that this assembly produces reliable and repeatable sealing force with little or no need for readjustment following installation. Positioning a column in the holder and making it ready for insertion takes about five seconds. Inserting the holder and locking it takes about three seconds.

From the above description, it can be understood that the technique has several advantages over prior capillary connection schemes.

While the present invention is particularly useful for coupling capillary tubing and for chromatographic applications, it is to be understood that the devices according to the present invention can be useful for coupling tubing of any diameter and type if appropriate dimensions of the insertion assembly, column (tube) holder, and corresponding fittings are provided.

While preferred embodiments have been described with some particularity, many modifications and variations to those embodiments are possible without deviating from the invention defined in the appended claims.

What is claimed is:

1. An apparatus for connecting an end of a tubular member to a device fitting, comprising:
   a holder for holding said end of said tubular member, said holder comprising a holder body, a spring-biased gripping means which normally grips and securely holds the tubular member, holder engaging means, and a ferrule through which the end of said tubular member passes; and
   an insertion assembly having an assembly fitting which mates with said device fitting, assembly engaging means for cooperating with said holder engaging means, at least one lever for moving said assembly engaging means, and a rotating member to which both said assembly engaging means and said lever are connected, said rotating member moving said assembly engaging means into and out of cooperating position with said holder engaging means in accordance with the position of said lever.

2. An apparatus as in claim 1, in which said tubular member is a chromatographic capillary tube.

3. A structure comprising two of the connecting apparatus defined in claim 1, and a tubular member.

4. An apparatus for connecting a tube to a fitting, comprising:
   a holder including first means movable between positions in which it grasps or releases said tube and second means likewise movable between tube grasping and releasing positions, said second grasping means normally being inoperative when said first grasping means is holding said tube;
   means for connecting said holder to said fitting with said first means grasping said tube; and
   means for moving said first grasping means to a position in which it releases said tube after moving said second grasping means to a position in which it grasps said tube and connects it to said fitting.

5. An apparatus as in claim 4, wherein said means for moving comprises at least one lever which, when activated, connects said second grasping means to said fitting.

6. An apparatus as in claim 5, wherein said lever is connected to a rotating member comprising engaging means which engage said holder and move said holder when said lever is activated.

7. An apparatus as in claim 6, wherein said holder comprises engaging means which mate with said engaging means of the rotating member.

8. An apparatus as in claim 7, wherein said engaging means of said rotating member is a protrusion and said engaging means of said holder is a recess.

9. An apparatus as in claim 8, wherein said protrusion is one or more cams.

10. An apparatus as in claim 9, wherein said cam comprises more than one radius, whereby more than one sealing force may be set by rotating a given cam radius into cooperation with said engaging means.

11. An apparatus as in claim 10, wherein said more than one sealing force can be applied to a deformable sealing member, such that deformable sealing members of different elasticities can be used therewith.

12. An apparatus as in claim 11, wherein said member is a ferrule.

13. An apparatus as in claim 6, wherein said rotating member is geared and actuated by a pinion or worm drive.

14. An apparatus as in claim 4, wherein said first grasping means comprises gripping jaws and said second grasping means comprise a ferrule.

15. An apparatus as in claim 14, wherein said gripping jaws are normally spring biased in a grasping position.

16. An apparatus as in claim 4, wherein said means for connecting comprises a rotatable spindle which can threadably engage said fitting.

* * * * *